United States Patent Office 3,577,427
Patented May 4, 1971

3,577,427
BROMINATION OF 2,1,3-BENZOTHIADIAZOLES
AND BENZOFURAZANS
Kurt H. Pilgram, Modesto, Calif., assignor to Shell Oil
Company, New York, N.Y.
No Drawing. Filed Sept. 5, 1968, Ser. No. 757,768
Int. Cl. C07d 85/48, 91/44
U.S. Cl. 260—304     5 Claims

ABSTRACT OF THE DISCLOSURE

Aqueous hydrobromic acid or nitric acid is used as the reaction medium for bromination of 2,1,3-benzothiadiazoles and benzofurazans.

BACKGROUND OF THE INVENTION

Field of the invention

This invention comprises an improved process for the bromination of 2,1,3-benzothiadiazoles and benzofurazans, which brominated compounds are particularly suited as intermediates in the preparation of novel herbicidal 2,1,3-benzothiadiazoles and benzofurazans as shown in co-pending application Ser. No. 600,371, filed Dec. 9, 1966 (now U.S. Pat. No. 3,478,044).

Description of the prior art

Most of the compounds capable of being prepared by the process of the invention are known. Formerly they were prepared by halogenation in the molten state either with or without a catalyst (usually iron filings) or organic solvent as reported by V. G. Pesin et al., J. Gen. Chem. (USSR) 27, 1648 (1957). The reported process proceeds by addition to yield compounds such as tetrabromotetrahydro-2,1,3-benzothiadiazole, which must be dehydrohalogenated (usually by alcoholic alkali metal hydroxide) to restore the aromatic structure to the ring.

SUMMARY OF THE INVENTION

To obtain halogen substituted 2,1,3-benzothiadiazoles and benzofurazans by the reported method involves the two-step process of halogenation followed by dehydrohalogenation.

It has now been discovered that 2,1,3-benzothiadiazoles and benzofurazans can be brominated directly to the mono- or di-bromo derivatives by reacting the benzothiadiazole or benzofurazan with elemental bromine in the presence of aqueous hydrobromic acid or nitric acid as reaction medium. When the bromination is conducted in this manner, the reaction proceeds nearly quantitatively by replacement of hydrogen by bromine, with little of the addition product being formed. Thus, the process of this invention, provides an effective way of obtaining brominated 2,1,3-benzothiadiazoles and benzofurazans in a single step, without requiring a dehydrobromination (second) step.

Thus, generally this invention is an improved process for the bromination of 2,1,3-benzothiadiazoles and benzofurazans in which a 2,1,3-benzothiadiazole or benzofurazan is reacted with elemental bromine in the presence of aqueous hydrobromic acid or nitric acid as the reaction medium.

DESCRIPTION OF THE PREFERRED EMBODIMENTS

Because of their value as precursors for novel herbicides, the preferred compounds to be brominated by the improved process are 2,1,3-benzothiadiazoles and benzofurazans of the formula

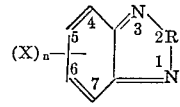

wherein R suitably is oxy(—O—) or thio (—S—) preferably thio; and each X suitably is halogen, that is fluorine, chlorine, bromine or iodine, preferably chlorine or bromine; amino (—NH$_2$) or alkyl of 1–4 carbon atoms, that is methyl, ethyl, propyl, isopropyl, butyl, sec-butyl, isobutyl, tert-butyl and the like, preferably methyl or ethyl and $n$ is 0, 1, 2 or 3, preferably 0, 1 or 2. Each X may be in the 4-, 5-, 6- or 7-position.

The process comprises brominating the benzothiadiazole or benzofurazan using aqueous hydrobromic acid or nitric acid as the reaction medium. The bromination is accomplished by adding elemental bromine to the acid reaction mixture. Alternatively, bromine may be generated in situ from hydrobromic acid by the addition of an oxidizing agent such as hydrogen peroxide. A combination of both the bromine addition and in situ generation methods may also be used. Because of the particular utility of the reaction products, it is preferred that the 2,1,3-benzothiadiazoles and benzofurazans be brominated using hydrobromic acid as the reaction medium.

It is not necessary that the compound to be brominated dissolve in the aqueous acid but may rather form a heterogeneous mixture with the acid and may be either liquid or solid at the reaction temperature.

A convenient method of performing the bromination is to add the benzothiadiazole or benzofurazan, preferably molten if possible, to the aqueous acid which has been heated to a temperature higher than the melting point of the starting compound if it is added molten. The mixture is then heated to reflux and bromine is added. If bromination is to be accomplished by in situ generation, hydrogen peroxide alone or in combination with bromine is added to the reaction mixture which is partially comprised of hydrobromic acid.

Use of the concentrated aqueous acid allows a higher reflux temperature than that obtainable with lesser concentrations. Since the reaction proceeds to completion faster at the higher temperature, use of concentrated aqueous acid is preferred although concentration as low as 35% w. for hydrobromic acid and 30% w. for nitric acid are suitable.

Fastest reaction rates are obtained at the reflux temperature of the reaction mixture which is, for example, about 130° C. (at atmospheric pressure) when 48% w. aqueous hydrobromic acid is used as the reaction medium. However, the temperature may range from about 50° C. up to the reflux temperature of the reaction mixture.

In cases where X represents an alkyl group, particularly in the 4- or 7-position, it may be necessary to maintain a reaction temperature somewhat below reflux to avoid bromination of the alkyl group as it may be brominated at the reflux temperature.

It is most convenient to carry out the bromination at atmospheric pressure. If reduced pressure is used, the reflux temperature of the reaction mixture is decreased resulting in increased reaction time. While pressure greater than atmospheric pressure allow higher reflux temperatures, the higher temperatures generally are not needed.

The ratio of aqueous acid to the 2,1,3-benzothiadiazole or benzofurazan is not critical and will vary according to the species of compound involved. Ratios of concentrated aqueous acid to the compound to be brominated may range from 2 liters or less up to 15 liters or more per kilogram of such compound depending upon such factors as whether the starting and brominated compounds are liquid or solid, soluble or insoluble in the reaction medium and the fluidity or any slurry that may form.

The molar ratio of bromine to the compound to be brominated depends generally upon the number of atoms of bromine to be introduced onto the ring. Electrophilic substitution onto these 2,1,3-benzothiadiazoles and benzofurazans occurs predominantly in the 4- or 7-positions in a two-step process with the 5- and 6-positions being relatively unreactive. Thus, if only one atom of bromine is to be substituted onto the ring, molar ratios of about 1 to 1 are necessary to prevent partial dibromination, particularly if both the 4- and 7-position are unsubstituted. On the other hand, if both the 4- and 7-position are unsubstituted and the desired compound is to be 4-, 7-dibrominated, a large excess of bromine, in some cases a molar ratio as high as 10 moles of bromine per mole of compound to be brominated, is suitable although molar ratios between about 3 to 1 and 5 to 1 are preferred.

When hydrogen peroxide is used to generate the bromine in situ, similar considerations are made in determining the molar ratio of hydrogen peroxide to the 2,1,3-benzothiadiazole or benzofurazan to be brominated. Generally the molar ratios are similar to those when elemental bromine is added to the reaction mixture.

When nitric acid is used as the reaction medium, the reaction proceeds nearly quantitatively to the 4,7-dibromo product and if care is taken, the reaction may be stopped at this point. However, the reaction may be allowed to proceed and the 4,7-dibromo product may be further reacted to a mixture of 4-bromo-7-nitro and 4,5,7-tribromo analogs. Also, 4,7-dibromo compounds which have been previously prepared may be heated in a nitric acid reaction medium and converted to the mixture of 4-bromo-7-nitro and 4,5,7-tribromo analogs, which may then be separated.

If hydrogen peroxide is used to generate the bromine in situ, dilution of the hydrobromic acid occurs because water is formed as a by-product of the bromine generation. This results in lower reflux temperatures and slower reaction rates than if elemental bromine is used.

If the bromine is added rather than generated, an efficient reflux condenser must be used. Hydrogen bromide, formed as a by-product of bromine substitution onto the ring, does not dissolve in the already saturated hydrobromic acid and so escapes the reaction vessel via the reflux condenser sweeping bromine vapor with it.

The brominated 2,1,3-benzothiadiazole or benzofurazan may be recovered by a variety of conventional methods depending upon the properties of the particular compound. These may include steam distillation, cooling of the reaction mixture followed by filtration, pouring the reaction mixture into water followed by filtration and the like.

The process according to the invention is illustrated by the following examples. All elemental analyses are expressed as percent by weight.

EXAMPLE I

Preparation of 4-bromo-7-(bromomethyl)-2,1,3-benzothiadiazole

A mixture of 15.5 grams (0.103 mole) of 4-methyl-2,1,3-benzothiadiazole and 30 milliliters of bromine (0.585 mole) in 100 milliliters of 48% w. aqueous hydrobromic acid was heated to reflux for 4.5 hours. The mixture was poured into ice water and filtered. The residue was recrystallized from about 150 milliliters of acetone to give 25 grams (80% yield) of 4-bromo-7-(bromomethyl)-2,1,3-benzothiadiazole. M.P. 132–137° C. Purity by gas-liquid chromatograph (GLC) 95%.

*Elemental analysis.*—Calculated for $C_7H_4N_2SBr_2$ (percent): N, 9.1; S, 10.4; Br, 51.9. Found (percent): N, 9.2; S, 11.0; Br, 49.0.

EXAMPLE II

Preparation of 4-bromo-7-methyl-2,1,3-benzothiadiazole

A mixture of 20 grams (0.133 mole) of 4-methyl-2,1,3-benzothiadiazole and 200 milliliters of 48% w. hydrobromic acid was heated with stirring at 65–70° C. while 9 milliliters bromine was added slowly over a period of 30 minutes. The mixture was maintained at 65–70° C. for an additional hour, poured into 500 milliliters ice water and filtered. The crystalline solid was recrystallized from methanol to give 27.3 grams (89.5% w. yield) of 4-bromo-7-methyl-2,1,3-benzothiadiazole. Purity by GLC 99%. M.P. 138–139° C.

*Elemental analysis.*—Calculated for $C_7H_5N_2SBr$ (percent): N, 12.2; Br, 39.9. Found (percent): N, 11.8; Br, 39.3.

EXAMPLE III

Preparation of 4,7-dibromo-5,6-dimethyl-benzofurazan

A mixture of 22.5 grams (0.152 mole) of 5,6-dimethyl-benzofurazan and 40 milliliters of bromine in 200 milliliters of 48% w. hydrobromic acid was heated to reflux for six hours. The reaction mass was cooled and poured into water. The resulting mixture was filtered and the yellow precipitate was washed with water, methanol and dried to give 39.3 grams (84.2% w. yield) of 4,7-dibromo-5,6-dimethyl-benzofurazan. Purity by GLC 99%. M.P. 144–146° C.

*Elemental analysis.*—Calculated for $C_8H_6ON_2Br_2$ (percent): N, 9.2; Br, 52.2. Found (percent): N, 9.1; Br, 50.2.

EXAMPLE IV

Preparation of 4,7-dibromo-2,1,3-benzothiadiazole

A mixture of 27.2 grams (0.2 mole) of 2,1,3-benzothiadiazole and 250 milliliters of 48% w. hydrobromic acid was heated to reflux. Hydrogen peroxide (90% w.), 50 milliliters, was added dropwise with stirring over a period of 6 hours. The reaction mass was poured into ice water. The resulting mixture was filtered, washed with water, methanol, and dried to give 55.6 grams (95% w. yield) of 4,7-dibromo-2,1,3-benzothiadiazole. M.P. 163–168° C.

EXAMPLE V

Preparation of 4-bromo-7-nitro-2,1,3-benzothiadrazole and 4,5,7-tribromo-2,1,3-benzothiadiazole (a) From 2,1,3-benzothiadiazole.—A mixture of 27.2 grams (0.s mole) of 2,1,3 - benzothiadiazole), 300 milliliters of 70% w. nitric acid and 144 grams (0.9 mole) of bromine was heated to reflux. After about one hour, a white crystalline solid precipitated out of the reaction mixture which was shown by GLC to be 4,7-dibromo-2,1,3-benzothiadiazole. The precipitate redissolved and after about 7 hours, a higher melting compound began to precipitate out. After 24 hours the reaction mixture was poured into water, filtered, washed well with water, then methanol and dried to yield 18.8 grams (36.1% w.) of impure 4-bromo-7-nitro-2,1,3-benzothiadiazole. Recrystallization from 75% w. aqueous acetic acid afforded the product which was about 90% w. (by GLC) 4-bromo-7-nitro-2,1,3-benzothiadiazole and melted at 215–216° C. The impurity was identified as 4,5,7-tribromo-2,1,3-benzothiadiazole.

*Elemental analysis.*—Calculated for $C_6H_2BrN_3OS$ (percent): Br, 30.8; N, 16.2; S, 12.4. Found (percent): Br, 34.0; N, 14.2; S, 12.3.

(b) From 4,7 - dibromo - 2,1,3 - benzothiadiazole.—A mixture of 147 grams (0.5 mole) of 4,7-dibromo-2,1,3-benzothiadiazole and 700 milliliters of 70% w. nitric acid was heated to 95° C. with stirring for 5.5 hours. The reaction mixture was cooled and poured into water, filtered, washed with water and dried to yield 90 grams of a mixture comprised of 4-bromo-7-nitro-2,1,3-benzothiadiazole and 4,5,7-tribromo-2,1,3-benzothiadiazole in a ratio of 7:3 respectively. This mixture was heated to reflux in acetone and filtered while hot. The insoluble white crystalline solid, M.P. 216–219° C. was pure (GLC) 4-bromo-7-nitro-2,1,3-benzothiadiazole (A). Fractional crystallization of the mixture remaining in the mother liquor resulted in a sample (B) which was 80% w. (by GLC) 4,5,7-tribromo-2,1,3-benzothiadiazole. The identity of sample B was established as follows: Both pure tribromo and sample B have identical retention times (GLC) and $R_F$-values (thin-layer chromatography). Elemental analysis of sample B is in good agreement with the calculated values.

*Elemental analysis of Sample B.*—Calculated for a mixture of 4,5,7-tribromo-2,1,3-benzothiadiazole (80% molar) and 4-bromo-7-nitro-2,1,3-benzothiadiazole (20% molar) (percent): Br, 61.0; N, 8.8. Found (percent): Br, 56.8; N, 8.6.

Infrared spectroscopy indicates that the mixture consists of at least 63% molar of 4,5,7-tribromo-2,1,3-benzothiadiazole in addition to about 22% molar of 4-bromo-7-nitro-2,1,3-benzothiadiazole and about 10% molar of an unidentified impurity.

On a large scale, the following compounds were prepared as shown in the examples.

EXAMPLE VI

Preparation of 4,5-dibromo-2,1,3-benzothiadiazole 2731 grams (12.7 moles) of 5-bromo-2,1,3-benzothiadiazole was combined with 12.6 liters of 48% w. hydrobromic acid in a five gallon Pfaudler kettle fitted with stirrer, thermowell and a reflux condenser vented to a caustic scrubber. The mixture was stirred and heated to 111° C. One liter, 1110 grams (9.8 moles) of 30% hydrogen peroxide was added over a period of 5.3 hours. A reflux temperature of 122° C., reached about 20 minutes after the start of the addition, gradually fell to 118° C. Since the reaction was proceeding slowly, addition of bromine, 600 milliliters (11.2 moles), was started to avoid further dilution with water. Bromine addition time was 8 hours at 118–116° C. Heating was stopped but stirring was continued overnight. The following morning, heating was resumed and the mixture was refluxed at 117–118° C. for an additional 5.4 hours. The mixture was cooled to 50° C. and the liquid phase was slowly drained off leaving the granular solid phase in the kettle. The solid was stirred with 4 liters of water and this rinse water was drained off as before, leaving the solid phase in the kettle. The solid was dissolved and removed from the kettle by stirring successively with 3 and then 2 gallons of hot methylene chloride. The two solutions were combined and approximately one liter of water was separated from the organic phase. Most of the methylene chloride was stripped off under vacuum and the precipitate was collected, air dried, and then vacuum dried at 70° C. and 380 torr for 3 days to give 3587 grams (12.2 moles, 96% w. yield) of 4,5-dibromo-2,1,3-benzothiadiazole of about 80% w. purity.

EXAMPLE VII

Preparation of 4,7-dibromo-2,1,3-benzothiadiazole

To a 20 gallon Pfaudler kettle fitted with stirrer, thermo-well and a reflux condenser vented to a caustic scrubber was added 78 lbs. aqueous 48% w. hydrobromic acid. This solution was heated to 60–70° C. at which time molten 2,1,3-benzothiadiazole (17.7 lb., 0.130 lb.-moles) was added. Heating was continued to reflux which commenced at 113° C. whereupon liquid bromine was fed slowly into the vapor space of the reactor. The addition rate and heat application were adjusted so that a light reflux was maintained and very little bromine was carried through the condenser into the scrubber. Under these conditions, 65.7 lb. of bromine (0.41 lb.-mole) was added over a period of 6.4 hours while the reaction temperature varied from 117 at the start to 110° C. at the end. At the end of the reaction, the remaining bromine was purged from the reactor with a nitrogen sweep. The solid product 4,7-dibromo-2,1,3-benzothiadiazole, was recovered from the cooled reaction mixture by filtration, washed with hot water and dried in a tray drier with hot air. Two separate reactions were run resulting in 74.6 lb. of product at an average crude yield of 95% molar. M.P. 176–178° C. Purity by infrared 95%.

Utilizing the process of the invention and following procedures analogous to those set forth in Examples I–VII the compounds in Table A were also prepared.

TABLE A

| Compound | Melting point, ° C. | Bromine Calculated | Bromine Found | Nitrogen Calculated | Nitrogen Found |
|---|---|---|---|---|---|
| 4-bromo-2,1,3-benzothiadiazole | 80 | 37.8 | 38.3 | 13.0 | 12.9 |
| 4,5,7-tribromo-2,1,3-benzothiadiazole | 165 | 64.3 | 65.7 | 7.5 | 7.5 |
| 4-bromo-7-(bromomethyl)-benzofurazan | 60–62 | 54.8 | 55.9 | 9.6 | 8.9 |
| 4-bromo-5-methyl-2,1,3-benzothiadiazole | 82–85 | 34.9 | 37.9 | 12.2 | 11.1 |
| 4,7-dibromo-5-methyl-2,1,3-benzothiadiazole | 147–148 | 52.0 | 53.0 | | |
| 4-bromo-5-methylbenzofurazan | 121.5–124 | 37.5 | 37.1 | 13.1 | 12.1 |
| 4-bromo-7-ethyl-2,1,3-benzothiadiazole | 40–41 | 32.4 | 35.2 | 11.3 | 10.6 |
| 4,7-dibromo-5,6-dimethyl-2,1,3-benzothiazole | 170–172 | 49.7 | 49.4 | 8.7 | 8.7 |

I claim as my invention:

1. In a process for brominating 2,1,3-benzothiadiazoles and benzofurazans of the formula

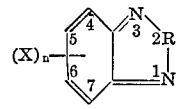

wherein R is oxy or thio, X is halogen amino or alkyl of 1–4 carbon atoms and *n* is 0–3, employing elemental bromine as the brominating agent, the improvement which comprises conducting the reaction in the presence of aqueous nitric acid or hydrobromic acid as the reaction medium wherein the volume to weight ratio of acid charged to compound to be brominated, when calculated as concentrated acid, ranges from about 2 liters to 15 liters per kilogram of compound, and at a reaction temperature ranging from about 50° C. up to the reflux temperature of the reaction mixture.

2. The improvement of claim 1 wherein each X is chlorine, bromine, amino, methyl or ethyl and *n* is 0–2.

3. The improvement of claim 1 wherein the reaction medium is hydrobromic acid.

4. The improvement of claim 3 wherein the bromine is generated in situ by adding an oxidizing agent to the reaction mixture.

5. The improvement of claim 4 wherein the oxidizing agent is hydrogen peroxide.

References Cited

UNITED STATES PATENTS 3,279,909  10/1966  Daams et al. _____ 260—304
3,478,044  11/1969  Slott et al. _____ 260—307

ALEX MAZEL, Primary Examiner

R. J. GALLAGHER, Assistant Examiner

U.S. Cl. X.R.

260—307